Feb. 12, 1952  R. L. BRUNSING  2,585,086
THERMOMETER AND METHOD OF DETERMINING
TEMPERATURE IN A VACUUM COOLING
CHAMBER FOR COOLING VEGETABLES
Filed Feb. 14, 1950

INVENTOR.
REX L. BRUNSING
BY
Boyken, Mohler & Beckley.
ATTORNEYS

Patented Feb. 12, 1952

2,585,086

UNITED STATES PATENT OFFICE 2,585,086

THERMOMETER AND METHOD OF DETERMINING TEMPERATURE IN A VACUUM COOLING CHAMBER FOR COOLING VEGETABLES

Rex L. Brunsing, San Francisco, Calif., assignor to Vacuum Cooling Company, San Francisco, Calif., a corporation of Nevada Application February 14, 1950, Serial No. 144,186

9 Claims. (Cl. 62—152)

This invention relates to a thermometer or temperature control means for indicating the temperature within a body of vegetables in a vacuum cooling chamber.

Certain types of vegetables, such, for example, as lettuce, cabbage, etc., when pre-cooled by placing them in a vacuum chamber and evaporating surface moisture from within the heads, present problems that have heretofore retarded the use of the vacuum cooling system because no dependable method was known for uniformly lowering the temperature throughout the heads to substantially 32° F.

In my copending application Serial No. 144,185, filed February 14, 1950, I have shown a method for satisfactorily lowering the temperature. The method shown in said application requires thrusting the pressure type thermometer between heads of lettuce, which operation some shippers dislike because of the possibility of mutilating the outer leaves of one or more heads of lettuce. Also, while said method is satisfactory where the produce is loaded into the vacuum chamber or tube through one end thereof and is unloaded from the same end, it is not convenient where the produce is loaded into one end of the vacuum tube and is unloaded from the opposite end.

Attempts to solve the problem by using the conventional wet bulb thermometers were unsuccessful, and equally unsuccessful were attempts to use any of the conventional thermometers in the chamber outside the load of produce.

One of the main objects of the present invention is the provision of a thermometer that may be placed within the vacuum chamber at a point outside the load of produce to be cooled, and which thermometer will closely follow the temperature variations that occur between heads of lettuce, where it is essential to know the exact temperature.

Another object of the invention is the provision of means within a vacuum tube or vacuum cooling chamber that need not be moved or changed, and that will quickly and accurately follow temperature variations in the chamber in the exact place in a load of produce in said chamber that is essential to the proper cooling of said produce without freezing the same or any part thereof.

Other objects and advantages will appear in the description and in the claims.

In the drawings, Fig. 1 is a semi-diagrammatic side view of a vacuum cooling tube with the present invention indicated therein.

Figure 1:
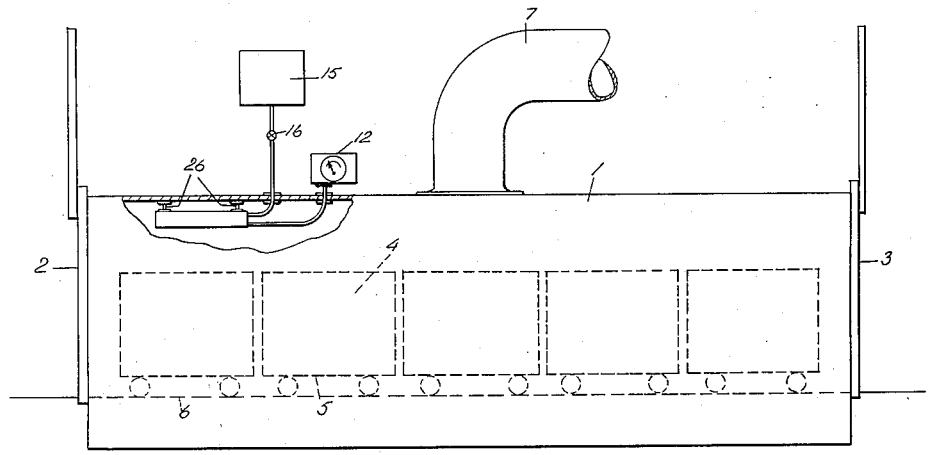

In detail, the vacuum tube is indicated at 1, and may be provided with gates 2, 3 at its opposite ends for loading produce, such as lettuce, into the tube at one end and for withdrawal of the produce from the opposite end. Such lettuce may be in crates 4 (indicated in dotted lines) that are on cars or trucks 5 mounted on tracks 6 that extend from end to end of the tube. Loading and unloading platforms or tracks (not shown) may extend to and from opposite ends of tracks 6 at opposite ends of the tube. The tube is connected with a pipe or conduit 7 that is in turn connected with any suitable means (not shown) for reducing the pressure within the tube 1 to say about an inch of mercury.

Conventional valve means anywhere in tube 1 or conduit 7 may be provided for breaking the vacuum and for admitting atmospheric air into the tube for equalizing the pressure therein with atmospheric pressure.

The present invention is concerned with the means to enable an operator outside the tube to know the temperature within the body of produce and especially between heads of lettuce in the crates without having to place a thermometer between said heads. It might be here stated that a conventional wet bulb thermometer placed within the tube 1 does not accurately give this temperature nor would a thermometer of any kind merely placed within the tube outside the body of produce.

Figure 2:
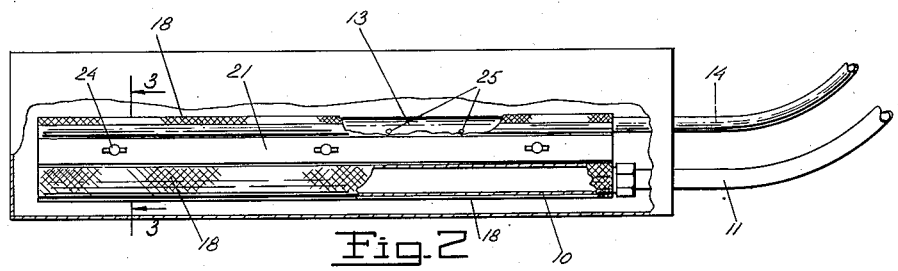
Fig. 2 is a side elevational view of the temperature control unit or bulb.

The thermometer of this invention comprises a conventional pressure type thermometer having an elongated hollow body 10 that contains a fluid, usually gas, and which body is connected at one end by a pipe or tube 11 (Fig. 2) with a Bourdon gauge 12 (Fig. 1), or the equivalent, outside the tube 1, for registering the temperature at the body 1. This pipe 11 is usually an armored tube and in the present instance it connects with a coupling that extends air tight through a wall of the tube 1, which coupling is in turn connected with the gauge 12.

The body 10 is normally horizontal, and spaced above the same, and parallel therewith, is a tube 13 that is parallel with body 1. One end of tube 13 is closed and the opposite end is connected by an extension 14 of said tube with a source of water 15 under pressure from outside the vacuum chamber. This tube 13 extends air tight through a wall of the vacuum chamber and any suitable control valve 16 may be in said tube outside said vacuum chamber between said tube and said source. The source of water may be ordinary tap water that is at substantially atmospheric temperature, which would substantially correspond with the temperature of the lettuce heads before they are pre-cooled. This water is under pressure and the flow may be controlled by valve 16, although the thermometer structure itself includes a control feature, as will later be explained.

Figure 3:
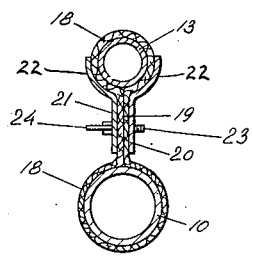
Fig. 3 is a sectional view taken along line 3—3 of Fig. 2.

Wicking material 18 encloses the tube 13 and the body 10 of the thermometer from end to end, this wicking preferably being of the woven type, such as the conventional tubular wick used in lamps, thus providing a uniform layer around the tube and thermometer. The wicking 18 extends between the tube 13 and body 10 to provide a web 19 (Fig. 3). By making the wicking 18 in the form of a fairly large tube and inserting the body 10 within the same at one side and the tube 13 at the opposite side and then drawing the wicking tightly about the said body and tube by bringing the wicking together between them, the preferred type of structure is formed since the wicking is of uniform weave and thickness throughout.

Pressure plates 20, 21 (Figs. 2, 3) comprising elongated metal strips held the web 19 flat between them, and one longitudinally extending marginal portion 22 of each plate is curved to partially extend around opposite sides of tube 13 the length of the latter. Bolts 23 extending through the plates 20, 21 at spaced points therealong are provided with wing nuts 24 to enable the operation to vary the pressure of the plates on the web 19 as desired.

Where the wicking extends around the body 10 of the pressure thermometer it is fully exposed for evaporation of moisture, and the wicking along the upper half of tube 13 is also so exposed. This tube 13 is provided with a row of small openings 25 that open into the portion of the wick that is covered by a pressure plate. Normally one row of such openings is found to be adequate, although the position of the openings may be staggered so that a substantial equal number open into the wicking along opposite sides of a plane extending longitudinally of the web and coplanar with said web.

Any suitable bracket members 26 may be provided for securing the thermometer assembly horizontally within the vacuum chamber with said tube 13 uppermost. When so supported within the vacuum chamber the assembly is out of the way of produce that is loaded into the chamber and that is withdrawn therefrom. The operator does not manipulate said assembly.

When the vacuum chamber is closed with a load of produce therein, such as lettuce or the like, the gauge 12 will register substantially the same temperature as that of the lettuce. As soon as the air is evacuated from the chamber, evaporation of moisture from the wicking 18 and from the lettuce will be accelerated and the gauge will commence to show a progressive decrease. All this time tap water, or water at substantially atmospheric temperature will be supplied to tube 13 at a rate of speed to constantly replenish the water being evaporated from the wicking. The temperature within the chamber will continue to be lowered and when the gauge indicates a reduced temperature of say 35° F. it has been found that the temperature between the lettuce heads or in the outer leaves will actually be the same temperature. At this point, where headed lettuce is being cooled, the operator will stop further evacuation of air from the chamber, but the latter will stay closed. The temperature within the chamber will continue to drop, and evaporation of moisture from the wicking will continue until the thermometer registers 32° F. when the operator will open the chamber to the atmosphere and further cooling will cease.

By the present thermometer assembly it has been discovered that the temperature registered by the thermometer will so exactly follow the temperature that exists between the heads of lettuce in the load as accurate as though the thermometer itself, apart from the wicking and water supply, were positioned between the heads as described in my copending application. Hence, in those instances when it is impractical or undesirable to follow the procedure mentioned in my said copending application, the present apparatus is substantially as efficient in giving the desired temperature.

It is also pertinent to note that in the present case, the lettuce is not torn or multilated by thrusting the thermometer into a crate of lettuce. The thermometer is preferably positioned out of the flow of moisture vapor from the lettuce to the exhaust conduit, inasmuch as greater accuracy can be obtained where the thermometer is adjacent an end of the vacuum chamber.

The wicking is saturated with water supplied from a source at atmospheric room temperature, which may normally be about 70° F., and is kept saturated throughout the evaporation step. Obviously under similar circumstances, the conventional wet bulb wick would freeze. This feed of water to the thermometer is fast enough under the conditions herein described to prevent substantial interior cooling of the water in the water supply tube. As soon as the vacuum is broken, and atmospheric air is admitted to the chamber, the thermometer will be almost immediately warmed by the supply of relatively warm water to thus reflect the elevated temperature.

The loading and unloading of the vacuum chamber may be very fast due to the present system, and the thermometer will follow temperature changes in the chamber as fast as they occur. There is no material "lag."

In the case of soft, puffy heads of lettuce, spinach, etc., the vacuum may be maintained constant and the moisture vapor continuously removed, until the thermometer registers 32° F., and then the vacuum may be broken at once and atmospheric pressure restored within the vacuum chamber. The cessation of evacuation need occur only where tightly headed vegetables are being cooled.

I claim:

1. The method of causing a thermometer to follow the temperature variations within a body of leaf vegetables in a vacuum cooling system and which vegetables have vaporizable surface moisture thereon that comprises the steps of placing said thermometer and said body of vegetables within an enclosed space and in spaced relation therein, withdrawing air from within said space to cause evaporation of said moisture and consequent cooling of said vegetables, and simultaneously enclosing said thermometer within a thin layer of water in heat transfer relationship thereto and with said layer subjected to the influence of the reduced air pressure within said space, continuously conducting water from outside said space through said space and to said thermometer at a rate of speed sufficient to maintain said film substantially constant.

2. The method of causing a thermometer to follow the temperature variations within a body of leaf vegetables in a vacuum cooling system and which vegetables have vaporizable surface moisture thereon that comprises the steps of placing said thermometer and said body of vegetables within an enclosed space and in spaced relation therein, withdrawing air from within said space to cause evaporation of said moisture and consequent cooling of said vegetables, and simultaneously enclosing said thermometer within a thin layer of water in heat transfer relationship thereto and with said layer subjected to the influence of the reduced air pressure within said space, continuously conducting water from outside said space through said space and to said thermometer at a rate of speed sufficient to maintain said film substantially constant, and free from an excess of moisture above the amount of said layer.

3. The method of causing a thermometer to follow the temperature variations within a body of leaf vegetables in a vacuum cooling system and which vegetables have vaporizable surface moisture thereon that comprises the steps of placing said thermometer and said body of vegetables within an enclosed space and in spaced relation therein, withdrawing air from within said space to cause evaporation of said moisture and consequent cooling of said vegetables, and simultaneously enclosing said thermometer within a thin layer of water in heat transfer relationship thereto and with said layer subjected to the influence of the reduced air pressure within said space, continuously conducting water from outside said space through said space and to said thermometer at a rate of speed sufficient to maintain said film substantially constant, said water being supplied to within said space at substantially atmospheric temperature.

4. In combination with a vacuum tube adapted to contain vegetables for cooling the same, a temperature recording instrument comprising a thermometer and a conduit for a liquid in side by side spaced relationship within said vacuum tube, a moisture conductor of fibrous material enclosing said thermometer and said conduit and disposed between said thermometer and said conduit for conducting moisture from said conduit to said thermometer, openings formed in said conduit for ejecting liquid therefrom to said conductor, means for supplying liquid to said conduit from outside said tube, a temperature indicator outside said tube and means connecting said thermometer with said indicator for indicating the temperature at said thermometer, means for controlling the rate of flow of liquid through said wicking material from said conduit to said thermometer.

5. A temperature indicator for use in a vacuum cooling system within a vacuum chamber comprising, an elongated pressure thermometer for a fluid, a tube extending alongside said thermometer in spaced relation thereto formed with a plurality of relatively small apertures for discharge of liquid therefrom, said tube being closed at one end and provided with means at its opposite end for connecting the same with a source of liquid for supplying liquid thereto, wicking material enclosing said thermometer and said tube and providing a web between said thermometer and said tube for conducting liquid from said tube to said thermometer.

6. A temperature indicator for use in a vacuum cooling system within a vacuum chamber comprising, an elongated pressure thermometer for a fluid, a tube extending alongside said thermometer in spaced relation thereto formed with a plurality of relatively small apertures for discharge of liquid therefrom, said tube being closed at one end and provided with means at its opposite end for connecting the same with a source of liquid for supplying liquid thereto, wicking material enclosing said thermometer and said tube and providing a web between said thermometer and said tube for conducting liquid from said tube to said thermometer, a pair of opposed plates disposed between said tube and said thermometer spacing said tube from said thermometer and clamping said web under pressure between said plates and means for varying the pressure of said plates on said web for controlling the rate of flow of liquid through said web.

7. A temperature indicator for use in a vacuum cooling system within a vacuum chamber comprising, an elongated pressure thermometer for a fluid, a tube extending alongside said thermometer in spaced relation thereto formed with a plurality of relatively small apertures for discharge of liquid therefrom, said tube being closed at one end and provided with means at its opposite end for connecting the same with a source of liquid for supplying liquid thereto, wicking material enclosing said thermometer and said tube and providing a web between said thermometer and said tube for conducting liquid from said tube to said thermometer, a pair of opposed plates disposed between said tube and said thermometer, a pair of opposed plates disposed between said tube and said thermometer spacing said tube from said thermometer and clamping said web under pressure between said plates and means for varying the pressure of said plates on said web for controlling the rate of flow of liquid through said web, said plates being formed with extensions partially extending around said thermometer with the said wicking material between said extensions and said thermometer, and means for supporting said thermometer and said tube horizontally within said chamber with said tube above said thermometer.

8. In combination with a vacuum tube adapted to contain vegetables for cooling the latter, a thermometer supported within said tube, a layer of moisture absorbent, moisture conductive material enclosing said thermometer, a conduit connected with a source of water outside said tube and extending into said tube to said layer for conducting water from said source to said layer, said conduit being apertured at said layer for discharge of water therefrom to said layer, a temperature indicator outside said tube connected with said thermometer for indicating outside said tube the temperature at said indicator.

9. In combination with a vacuum tube adapted to contain vegetables for cooling the latter, a thermometer supported within said tube, a layer of moisture absorbent, moisture conductive material enclosing said thermometer, a conduit connected with a source of water outside said tube at substantially tap water temperature and extending into said tube to said layer for conducting water from said source to said layer, said conduit being apertured at said layer for discharge of water therefrom to said layer, a temperature indicator outside said tube connected with said thermometer for indicating outside said tube the temperature at said indicator, a suction conduit opening into the upper side of said tube for withdrawing air and the evaporated moisture from within said tube, and means for supporting said thermometer within the upper portion of said tube spaced from said suction conduit so as to be out of the direct flow of air into said suction conduit.

REX L. BRUNSING.

REFERENCES CITED

The following references are of record in the file of this patent:

UNITED STATES PATENTS

| Number | Name | Date |
| --- | --- | --- |
| 1,404,400 | Moon | Jan. 24, 1922 |
| 2,494,769 | Mabey | Jan. 17, 1950 |

FOREIGN PATENTS

| Number | Country | Date |
| --- | --- | --- |
| 389,535 | Great Britain | Mar. 23, 1933 |